United States Patent [19]
Cappuccio

[11] Patent Number: 6,119,718
[45] Date of Patent: Sep. 19, 2000

[54] CYLINDER VALVE SAFETY COVER

[76] Inventor: Louis W. Cappuccio, 16 Mill Run Dr., Hammonton, N.J. 08037

[21] Appl. No.: 09/379,849

[22] Filed: Aug. 24, 1999

[51] Int. Cl.[7] ..................................................... F16L 35/00
[52] U.S. Cl. ............................................. 137/382; 137/317
[58] Field of Search ..................................... 137/377, 382

[56] References Cited

U.S. PATENT DOCUMENTS

| | | | |
|---|---|---|---|
| 3,722,533 | 3/1973 | Connolly | 137/382 |
| 4,352,370 | 10/1982 | Childress | 137/382 |
| 4,380,247 | 4/1983 | Douglas | 137/382 |
| 4,600,033 | 7/1986 | Baron | 137/382 |
| 4,648,526 | 3/1987 | Wood, Jr. | 220/724 |
| 4,651,888 | 3/1987 | Wood, Jr. | 220/724 |
| 4,678,003 | 7/1987 | Griffin | 137/382 |
| 4,781,044 | 11/1988 | Ortega | 70/177 |
| 4,880,134 | 11/1989 | Wood, Jr. | 220/724 |
| 4,944,424 | 7/1990 | Wood, Jr. | 220/724 |
| 5,004,117 | 4/1991 | Kitsuda | 220/724 |
| 5,035,195 | 7/1991 | Wille | 116/277 |
| 5,058,758 | 10/1991 | Suddeth | 220/85 P |
| 5,092,359 | 3/1992 | Wirth | 137/382 |
| 5,160,065 | 11/1992 | Libes | 220/724 |
| 5,261,559 | 11/1993 | Salvucci, Sr. | 220/727 |
| 5,429,152 | 7/1995 | Straaten et al. | 137/377 |
| 5,547,099 | 8/1996 | Chang | 220/212.5 |
| 5,638,858 | 6/1997 | Gettinger | 137/382 |

*Primary Examiner*—A. Michael Chambers
*Assistant Examiner*—Thomas L. McShane
*Attorney, Agent, or Firm*—Stuart M. Goldstein

[57] ABSTRACT

An integral, one piece cover for a cylinder tank vessel valve is provided with a flexibly expandable housing, preferably formed of resilient molded plastic. The housing has a slot at the bottom, along one side. There is an opening formed adjacent to the slot. Dual locking tabs on the housing are adapted to receive a locking device. The cover is placed over the valve of a tank or any other upwardly extending valve by spreading the tabs apart, thus causing the slot to open and expand the lower portion of the housing. In this expanded state, the slot passes over the valve's hose or piping connection. The connection is then positioned within the opening and the tabs are released. The resilient nature of the housing biases the slots to close around the connector. The housing can At then be secured with a lock through the locking tabs. Once secured, the valve cannot be accessed without removal of the lock. When the cover is placed over the valve and is secured, it has the added benefit of providing protection of the valve during transport of the tank.

36 Claims, 3 Drawing Sheets

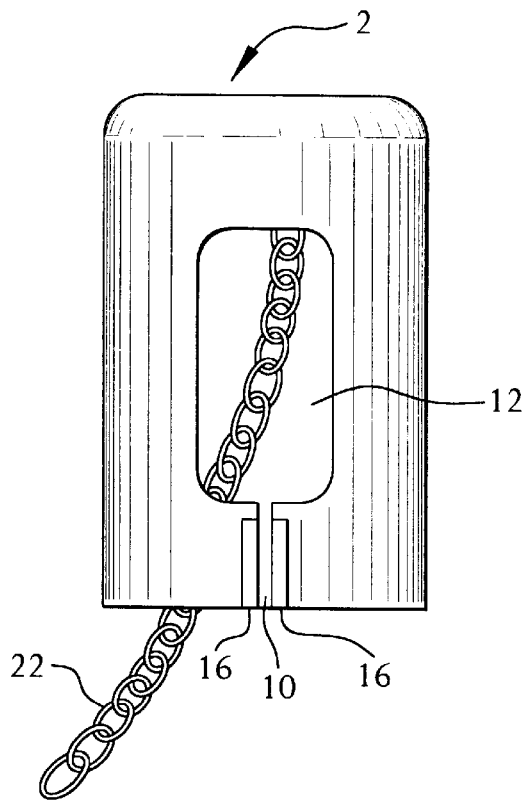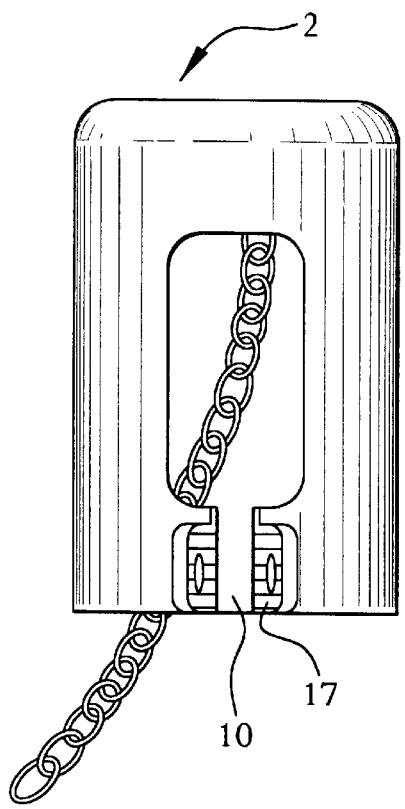
FIG. 2   FIG. 3
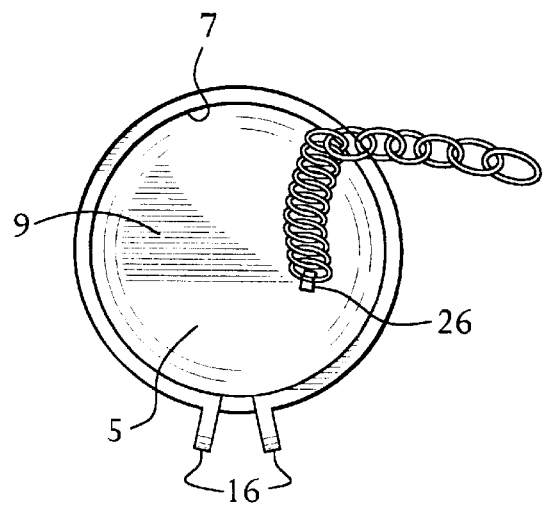
FIG. 4

CYLINDER VALVE SAFETY COVER

BACKGROUND OF INVENTION

It is common practice to store gaseous fluids like oxygen, acetylene, butane, propane, nitrogen, hydrogen, helium and others in a variety of storage vessels. Examples of such vessels run the gamut from cylindrically shaped transportable tanks for commercial and industrial usage, to propane tanks use in residential environments, like in barbeque grills.

Fluid access to such tanks is usually gained through shut-off valves mounted on the tanks. Piping or hoses connected to the valve connections provide the means to allow transport of the fluids to their destinations. The valves on the tank systems are routinely located in a convenient position, to allow ease of usage and accessability for the user. However, placement of the valves also makes them easily accessible to unauthorized users of the tanks and misuse by individuals who may accidentally leave such valves open, thus inadvertently releasing the gaseous fluids contained in the tanks.

For example, in industrial settings, cylindrical tanks supply gases for welding and burning operations. At the end of the working day, the shut-off valves to these tanks are closed, but they are not secured from unauthorized use. Such valves can easily be opened and the valves subsequently left unsecured. Often times, when valves are left opened, a danger and a hazard of explosion are created. At the very least, when valves are inadvertently left open, the gas is emptied from the tank and wasted. The tank must to be refilled, causing the incursion of unnecessary expense.

The unsecured tank valve on the propane tank of a barbeque grill presents a similar hazard if left unsecured. Such valves can be left on by mistake or can be opened by children. Again, unsecured valves left open will result in a potential danger of explosion and will result in the tank being empty prematurely.

There previously has been no simple, economic and efficient solution to this problem of providing security for tank valving. Systems have been developed which are fairly complex, with a number of moving parts, as is shown in U.S. Pat. No. 4,781,044. Other devices merely provide a cover which is designed to protect the tank valving during transport, as described in U.S. Pat. No. 5,160,065. Still others, as shown in U.S. Pat. Nos. 4,678,003, 5,092,359, and 5,638,858, are constructed of a number of rigid, interconnected parts. Such valve enclosure devices provide problems with and expense of manufacture, they have multiple components, are generally not easily used, must be maintained, and do not have a prolonged life.

Accordingly, it is the object of the present invention to provide a tank valve safety and security cover which overcomes the limitations and deficiencies of prior devices.

It is the object of the present invention to provide a tank valve safety and security cover which simply and effectively secures a tank or any fluid control valve from unauthorized use or misuse.

It is a further object of the present invention to provide a tank valve safety and security cover which is simple and economical to manufacture.

It is still another object of the present invention to provide a tank valve safety and security cover which effectively secures a tank valve or any fluid control valve from being used improperly, thus reducing dangerous hazards of explosion.

It is another object of the present invention to provide a tank valve safety and security cover which can easily and conveniently be sized for use on a variety of valves and tank vessels.

It is still another object of the present invention to provide a tank valve safety and security cover which provides a measure of protection to tank valves during transport of the tank.

It is a further object of the present invention to provide a tank valve safety and security cover which can easily and effectively be used to secure an upwardly extending valve.

The present invention comprises an integral, one piece cover for a cylinder tank vessel valve which comprises a flexibly expandable housing, preferably formed of resilient molded plastic. The housing has a slot at the bottom, along one side. There is an opening formed adjacent to the slot. Dual locking tabs on the housing are adapted to receive a locking device. The cover is placed over the valve of a tank or any other upwardly extending valve by spreading the tabs apart, thus causing the slot to open and expand the lower portion of the housing. In this expanded state, the slot passes over the valve's hose or piping connection. The connection is then positioned within the opening and the tabs are released. The resilient nature of the housing biases the slots to close around the connector. The housing can then be secured with a lock through the locking tabs. Once secured, the valve cannot be accessed without removal of the lock. When the cover is placed over the valve and is secured, it has the added benefit of providing protection of the valve during transport of the tank.

BRIEF DESCRIPTION OF THE DRAWINGS

FIG. 2 is an elevation view of the valve cover of the invention, showing the cover with its locking tabs at rest in a biased closed position.

FIG. 3 is an elevation similar to FIG. 3, but showing the cover with its locking tabs in a spread apart, expanded position.

FIG. 4 is a bottom view of the valve cover of the invention showing the cover with its locking tabs in a spread apart, expanded position.

DETAILED DESCRIPTION OF THE INVENTION

Figure 1:
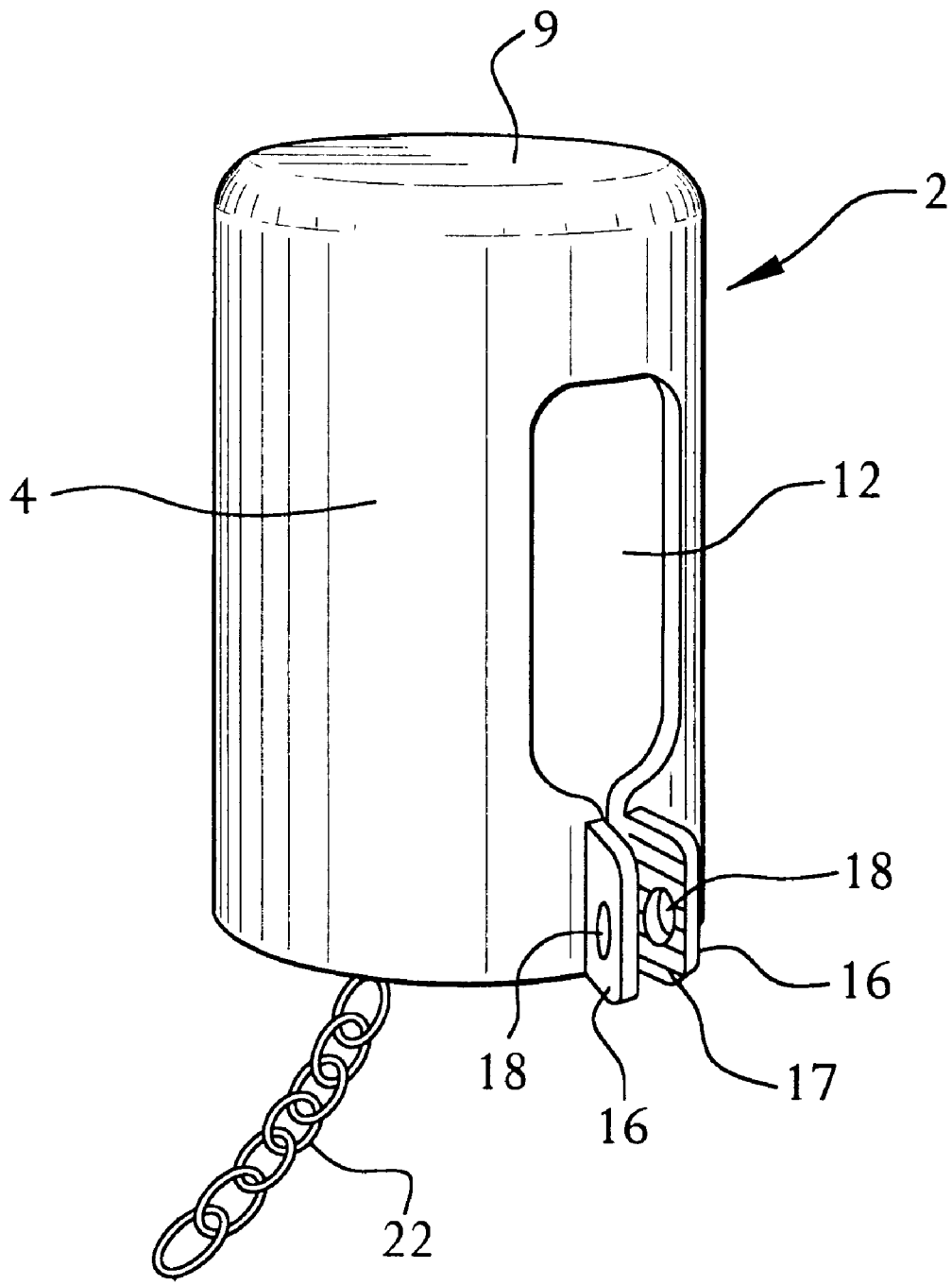
FIG. 1 is a perspective view of the valve cover of the invention.

Valve cover 2 comprises housing 4 which, as shown in FIG. 1, is cylindrical in shape with a flat bottom. Housing 4 may be shaped for any particular valve configuration or for esthetic taste. However, housing 4 must be configured to totally enclose valve 6 of cylinder tank 8 or similar fluid containing vessel, so that cover 2 can easily be placed over the valve through the open bottom 5 of the cover, and mounted on the tank such that there is sufficient space between the housing and the valve to ensure that no part of valve 6 contacts the side 7 or top 9 of the cover.

It is contemplated that cylinder tank 8 or similar fluid containing vessel, could contain any number of fluid gases, including oxygen, helium, butane, propane, acetylene, etc.

Such tanks are used for commercial and industrial purposes, like welding and burning and also for residential purposes such as supplying the fuel for home barbeque grills.

Housing 4 of cover 2 comprises slot 10 along the bottom of one side of the housing. Opening 12 formed adjacent to slot 10 is provided to allow the passage of the valve's hose connection 14 and hose 15 or similar gas fluid transfer line. Housing 4 is also configured to completely cover valve 6 and ultimately to cover connection 14. Locking tabs 16 are integrally formed at the lower end of cover 2. Tabs 16 are somewhat flared outwardly and may have rough surface 17 at their ends to allow more convenient and easier use of one's thumbs when cover 2 has to be placed in position. Tabs 16 also have openings 18 which are configured to accept locking device 20. Standard combination or key actuated locks can be used for insertion into openings 18.

Cover 2 is formed of resilient moldable plastic, manufactured as a single integral piece which includes slot 10, opening 12, and tabs 16. Forming cover 2 in this manner ensures that the cover is resiliently and flexibly biased such that when tabs 16 are spread apart, slot 10 opens. Opening 12 and slot 10 enhances the flexible nature of cover 2, easily allowing expansion of open bottom 5 when tabs 16 are spread apart. When tabs 16 are released, the flexibly biased nature of housing 4 causes the housing and its open bottom 5 to return to its normal undeformed position, as shown in FIG. 2.

A chain or similar line 22 is provided with a looped handle 24 at one end. Line 22 is secured to top 9 of housing 4 by means of rivet 26, or similar attachment means. Handle 24 is normal looped around valve 6.

Figure 5:
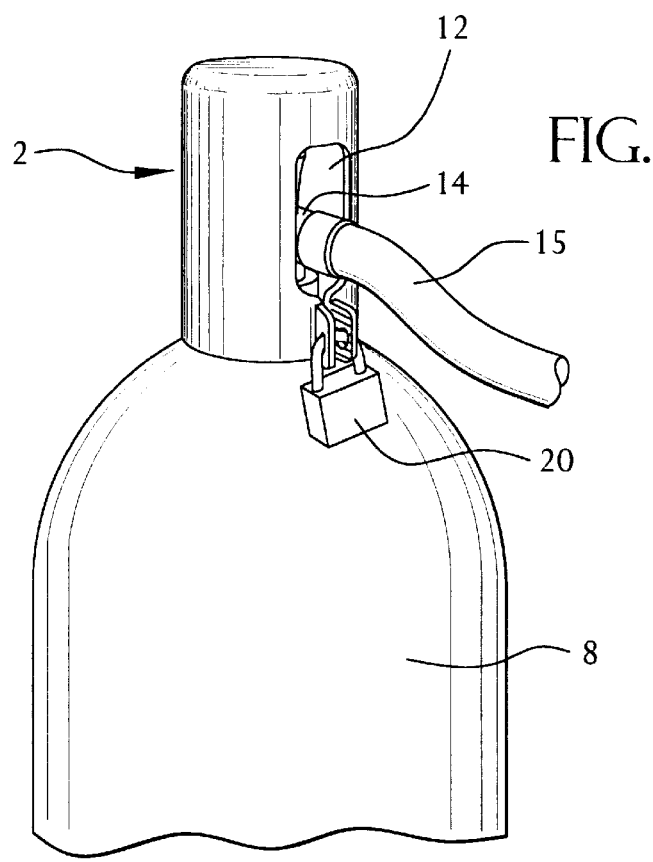
FIG. 5 is a view of the valve cover of the invention mounted and secured in locked position over a valve on a cylinder tank.

In use, cover 2 is to be placed over valve 6 on tank 8. The flexibly biased nature of housing 4 permits slot 10 to open when tabs 16 are spread apart. As tabs 16 are parted, as seen in FIG. 3, slot 10 and open bottom 5 expand, allowing easy placement of cover 2 over valve 6; and, most significantly, when slot 10 expands, the resulting expanded space of slot 10 allows cover 2 also to be placed over hose connection 14. Connection 14 is then positioned through opening 12, as seen in FIG. 5. As cover 2 is placed directly on the surface of tank 8 and hose connection 14 is positioned within opening 12, tabs 16 are released. The flexibly biased nature of housing 4 causes slot 10 to close, causing opening 12 to close around connection 14. Tabs 16 come together and openings 18 are positioned in alignment. Lock 20 is then inserted through openings 18 to secure and lock cover 2 onto the tank. Cover 2 cannot be removed unless lock 20 is removed. Thus, while lock 20 is in place, access to valve 6 of tank 8 is denied. The integrity of the valve as to unauthorized users remains in tack.

Figure 6:
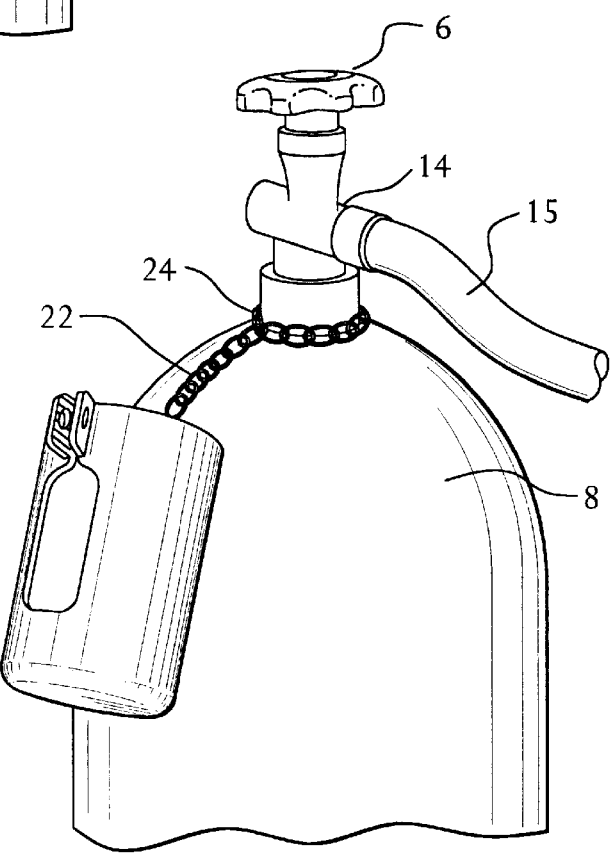
FIG. 6 is a view of the valve cover of the invention secured to a cylinder tank, but off of the valve of the tank in a non-use position.

After opening and removing lock 20, cover 2 can easily be removed from the top of tank 8 by again moving tabs 16 apart, thus again opening slot 10. Cover 2 can then be lifted over and off hose connection 14 again providing access to valve 6. When cover 2 is off tank 8 and valve 6, it is designed to hang alongside the tank by means of line 22 secured around the valve by means of looped handle 24, as seen in FIG. 6. By this configuration, cover 2 will always be available for immediate and accessible placement on tank 8.

Certain novel features and components of this invention are disclosed in detail in order to make the invention clear in at least one form thereof. However, it is to be clearing understood that the invention as disclosed is not necessarily limited to the exact form and details as disclosed, since it is apparent that various modifications and changes may be made without departing from the spirit of the invention.

What is claimed is:

1. A cover for a fluid containing vessel having a fluid control valve with a fluid transfer line connection, said cover being an integral component comprising:
   (a) resilient, flexibly biased expandable housing means for placement in position over the valve for preventing access to the valve, said housing means having an open bottom and a top configured such that the housing means forms an enclosure;
   (b) separation means in the housing means which is normally biased closed as a result of the biased nature of the housing means, said separation means configured to be biased open to enhance the expandability of the housing, whereby when the separation means is biased open, the housing means expands to permit the line connection to pass through the separation means; and
   (c) resilient, flexibly biased locking means for opening the separation means and for securing the cover to the vessel, said locking means preventing access to the valve when the housing means is placed in position over the valve and the separation means is biased closed.

2. A cover as described in claim 1 wherein the housing means further comprises opening means for enclosing the connection after the connection passes through the separation means.

3. A cover as described in claim 2 wherein the opening means is formed adjacent to the separation means.

4. A cover as described in claim 3 wherein the housing means is integrally formed of flexibly resilient molded plastic.

5. A cover as described in claim 1 wherein the separation means comprises a slot formed in the housing means.

6. A cover as described in claim 5 further comprising an opening means formed adjacent to the slot, the opening means enclosing the connection after the connection passes through the slot.

7. A cover as described in claim 6 wherein the housing means is integrally formed of flexibly resilient molded plastic.

8. A cover as described in claim 1 wherein the housing means is integrally formed of flexibly resilient molded plastic.

9. A cover as described in claim 1 wherein the locking means comprises flexibly biased tab means which, when spread apart, opens the separation means, said tab means configured to receive a locking device.

10. A cover as described in claim 9 wherein the tab means comprise dual tabs.

11. A cover as described in claim 10 wherein the housing means is integrally formed of flexibly resilient molded plastic.

12. A cover as described in claim 9 wherein the locking device is a manually activated lock.

13. A cover as described in claim 1 wherein the vessel is a tank which contains a gaseous fluid.

14. A fluid control valve security system for a fluid containing tank comprising:
   (a) a valve positioned on the tank, said valve having a fluid line transfer connection;
   (b) an integral, resilient, flexibly biased and expandable housing, said housing means having an open bottom and a top configured such that the housing means forms an enclosure;
   (c) separation means formed in the housing, the separation means normally being biased in a closed position as a result of the biased nature of the housing, but being biased open when the housing is expanded, said separation means, in the open position, expanding the housing to allow the connection to pass into the housing;

(d) resilient, flexibly biased locking tabs extending from the housing for opening the separation means; and (e) locking means for insertion into the locking tabs.

15. The control valve security system as described in claim 14 wherein the housing is integrally formed of flexibly resilient molded plastic.

16. The fluid control valve security system as described in claim 14 wherein the locking means is a manually activated lock.

17. The fluid control valve security system as described in claim 14 wherein the separation means comprises a slot formed in the housing.

18. The fluid control valve security system as described in claim 14 further comprising an opening formed in the housing.

19. The fluid control valve security system as described in claim 14 wherein the tank contains a gaseous fluid.

20. A cover for a fluid control valve with a valve handle and valve stem, said cover being an integral component comprising:

(a) flexibly biased expandable housing means for placement in position over the valve and for preventing access to the valve, said housing means having an open bottom and a top configured such that the housing means forms an enclosure;

(b) separation means in the housing means which is normally biased closed as a result of the biased nature of the housing means, said separation means configured to be biased open to enhance the expandability of the housing, whereby when the separation means is biased open, the housing means expands to permit the valve to pass into the housing;

(c) resilient, flexibly biased locking means for opening the separation means and for securing the cover to the valve, said locking means preventing access to the valve when the housing means is placed in position over the valve and the separation means is biased closed.

21. A cover as described in claim 20 further comprising an opening formed in the housing means.

22. A cover as described in claim 21 wherein the opening means is formed adjacent to the separation means.

23. A cover as described in claim 22 wherein the housing means is integrally formed of flexibly resilient molded plastic.

24. A cover as described in claim 20 wherein the separation means comprises a slot formed in the housing means.

25. A cover as described in claim 24 further comprising an opening formed in the housing means, adjacent to the slot.

26. A cover as described in claim 25 wherein the housing means is integrally formed of flexibly resilient molded plastic.

27. A cover as described in claim 20 wherein the housing means is integrally formed of flexibly resilient molded plastic.

28. A cover as described in claim 20 wherein the locking means comprises tab means for opening the separation means and for receiving a locking device.

29. A cover as described in claim 28 wherein the tab means comprise dual tabs.

30. A cover as described in claim 29 wherein the housing means is integrally formed of flexibly resilient molded plastic.

31. A cover as described in claim 28 wherein the locking device is a manually activated lock.

32. A cover as described in claim 20 wherein the valve also comprises a fluid transfer line connection and the housing means further comprises opening means for enclosing the connection after the connection passes through the separation means.

33. A cover as described in claim 32 wherein the opening means is formed adjacent to the separation means.

34. A cover as described in claim 33 wherein the housing means is integrally formed of flexibly resilient molding plastic.

35. A cover as described in claim 24 wherein the valve also comprises a fluid transfer line connection and the cover further comprises opening means formed adjacent to the slot, the opening means enclosing the connection after the connection passes through the slot.

36. A cover as described in claim 35 wherein the housing means is integrally formed of flexibly resilient molded plastic.

* * * * *